CIRCUIT ARRANGEMENTS FOR DYNAMIC LATERAL CONVERGENCE

INVENTORS
RIJK HOOGHORDEL,
ANTHONIE J. MOGGRÉ
BY
AGENT

INVENTORS
RIJK HOOGHORDEL,
ANTHONIE J.MOGGRE
BY
[signature]
AGENT

INVENTORS
RIJK HOOGHORDEL,
ANTHONIE J. MOGGRÉ
BY
Frank R. Trifari
AGENT

United States Patent Office 3,441,788
Patented Apr. 29, 1969

3,441,788
CIRCUIT ARRANGEMENTS FOR DYNAMIC LATERAL CONVERGENCE

Rijk Hooghordel and Anthonie Jannis Moggre, Emmasingel, Eindhoven, Netherlands, assignors to North American Philips Co. Inc., New York, N.Y., a corporation of Delaware Filed Dec. 20, 1966, Ser. No. 603,379
Claims priority, application Netherlands, Jan. 18, 1966, 6600602
Int. Cl. H01j 29/50
U.S. Cl. 315—13 13 Claims

ABSTRACT OF THE DISCLOSURE

The device disclosed is a system for producing dynamic lateral convergence of one or more of the three electron beams of a wide angle color television display tube. The color tube includes a magnetic yoke arranged about the neck of the tube and one or more adjustable permanent magnets cooperating therewith to produce an adjustable static lateral convergence of the three electron beams. In addition, dynamic lateral convergence is applied to one or more of the electron beams by means of one or more coils arranged on the yoke to produce lateral convergence magnetic fields within the tube. An alternating current having a waveform which can be adjusted to compensate for various degrees of divergence of the three electron beams is supplied to said coils by means of a circuit including a saturable reactor connected in series therewith and to a winding of the horizontal deflection transformer.

The invention relates to dynamic correction systems for color television receivers. More particularly, the invention relates to a circuit arrangement for dynamic lateral convergence of at least one of the three electron beams emitted by three electron guns of a colour television display tube of the type comprising, deflection means with a line output transformer for the common deflection of the electron beams, in which the means for lateral convergence comprise at least one coil which, when traversed by a current, produces a magnetic field such that in the direction of a line a lateral force is exerted on at least one of the three electron beams.

It is known that in a three-gun television display tube of the so-called shadow-mask type it is strictly necessary for the three electron beams, when deflected across the whole screen of the display tube, to pass through one common point at the area of the mask (in view of the size of the electron beams in space the common point has rather to be considered as being a common area, but for the sake of simplicity reference will be made hereinafter to the common point). If this is not the case, colour errors are produced.

In display tubes having small deflection angles, for example, 70°, it is sufficient, as will be explained more fully hereinafter, to apply only radial convergence to the electron beams. With larger angles of deflection (90° or 110°), however, it appears to be necessary to apply, in addition, so-called lateral convergence. It has been found that this lateral convergence requires that currents of a particular waveform be passed through the coil that produces the lateral convergence. The object of the invention is to provide an arrangement capable of producing these particular currents.

For this purpose the circuit arrangement features a convergence coil connected in series with an inductor having a saturable core to a winding of the line output transformer.

A possible embodiment of the circuit arrangement according to the invention will be described with reference to the accompanying figures, in which.

Figure 3:
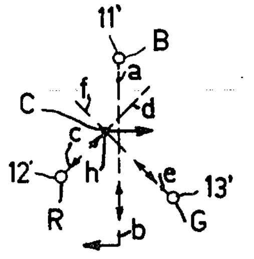
Figures 4A, 4B, 5A, 5B, 6A, 6B:
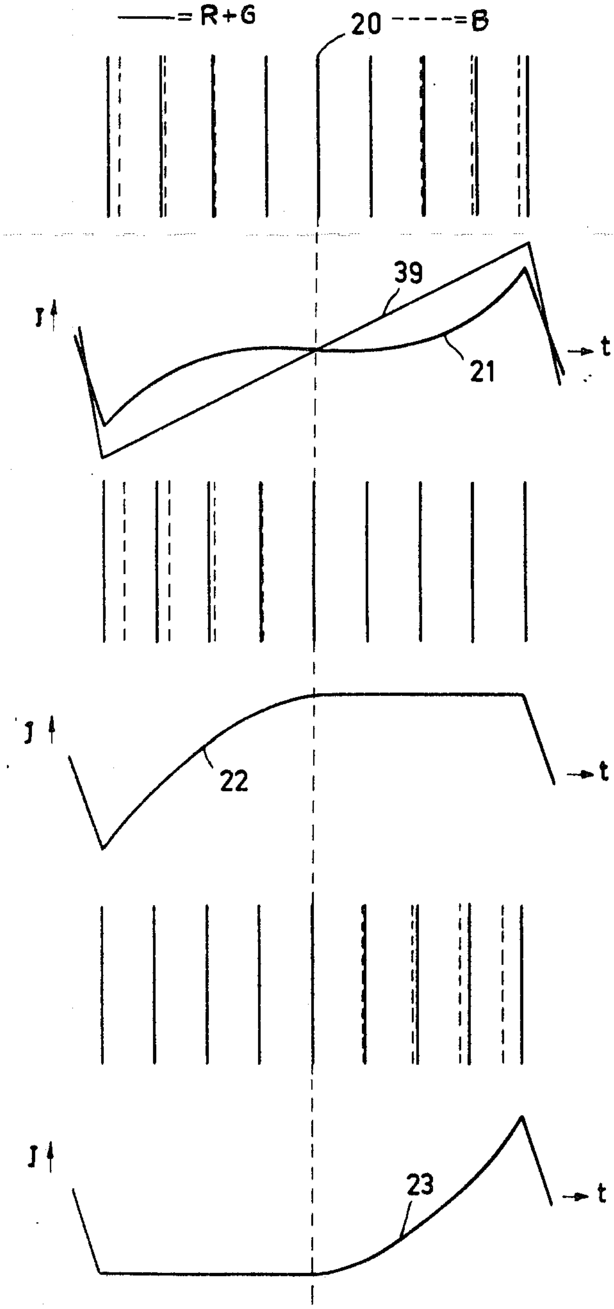

FIG. 3 serves to explain the radial and lateral convergences,

FIGS. 4*a* and 4*b* show the deviation and the required lateral convergence current in the case of symmetrical departures on either side of the vertical central line of the screen, FIGS. 5*a* and 5*b* show the deviation and the required convergence current in the case of a departure on the left-hand side, and FIGS. 6*a* and 6*b* show the deviation and the required convergence current in the case of a departure on the right-hand side of the vertical central line.

Figure 7:
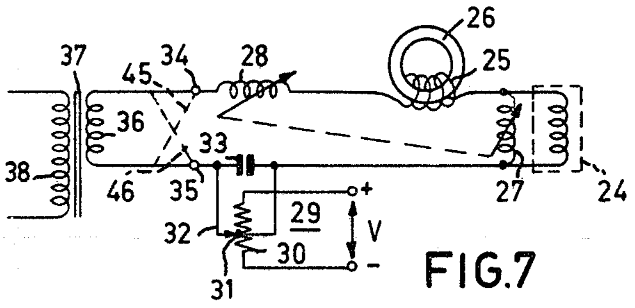

FIG. 7 shows the arrangement for producing the currents illustrated in FIGS. 4*b*, 5*b* and 6*b* and FIG. 8 shows a curve of the inductance L of the saturable inductor as a function of the current $I_1$ flowing therein.

Figure 1:
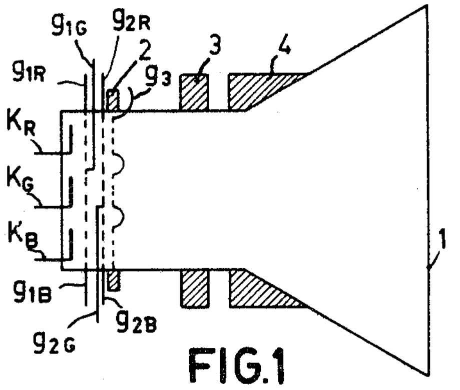
FIG. 1 shows a display tube with the deflection and convergence means.

Referring to FIG. 1, reference numeral 1 designates a three-gun color display tube of the so-called shadow-mask type. Each gun of this tube comprises a cathode K, a control-grid $g_1$, a screen-grid $g_2$ and a focusing electrode $g_3$. As a matter of course, the tube may be equipped with further grids and an acceleration anode, which are not essential for a good understanding of the invention, so that they are omitted. The cathode K and the first and second control-grids $g_1$ and $g_2$ are separately constructed for each of the three guns. The red gun comprises a cathode $K_R$, a first control-grid $g_{1R}$ and a screen or post acceleration grid $g_{2R}$. The green gun comprises similarly the electrodes $K_G$, $g_{1G}$ and $g_{2G}$. The blue gun comprises likewise the electrodes $K_B$, $g_{1B}$ and $g_{2B}$. The focusing grid $g_3$ is common to the three guns.

At the area of the focusing grid $g_3$ the neck of the tube 1 is surrounded by the lateral-convergence means 2, which will be described more fully with reference to FIG. 2. The neck of the tube 1 is furthermore surrounded by radial convergence means 3 of known type, comprising permanent magnets for static radial convergence and coils for dynamic radial convergence. Deflection means 4, formed by coils for the line deflection and coils for the field deflection, are arranged partly around the neck and partly around the cone of the tube 1. The deflection coils are constructed so that no deflection errors will occur. However, for large angles of deflection, this requires that special steps have to be taken, especially for the lateral convergence.

Figure 2:
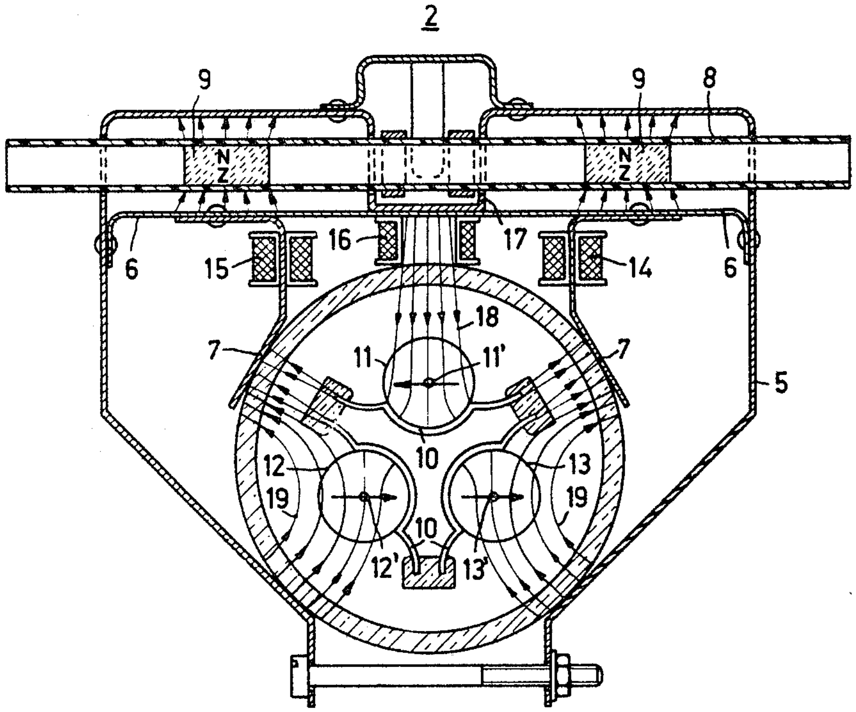
FIG. 2 shows in detail the means for producing the lateral convergence.

The lateral convergence means 2 are shown in detail in FIG. 2. They comprise a yoke 5 of permeable material, which satisfactorily passes the magnetic lines of force. For stiffening purposes, this yoke is provided with a supporting beam 6 of non-magnetic material, on which side pieces 7, composed of a permeable material that satisfactorily passes the magnetic lines of force, are fastened by their bases. The yoke 5 also comprises a rotatable support 8 provided with permanent magnets 9. The support 8 is not displaceable in a lateral direction, so that the permanent magnets 9 are always located above the bases of the side pieces 7. The tube 1 also comprises supports 10 composed of permeable material.

Reference numerals 11 and 11' designate the place of the blue gun and of the blue electron beam, respectively, 12 and 12' designate the place of the red gun and of the red electron beam, respectively, and 13 and 13' designate the place of the green gun and of the green electron beam, respectively. FIG. 2 shows coils 14 and 15, arranged around the side pieces 7. A coil 16 is furthermore provided just above the blue gun. By means of the permanent magnets 9, a field of lines of force is produced from the North pole N of said magnets via the yoke 5 through the parts thereof engaging either side of the neck of the tube 1 (see the bottom side of FIG. 2), via the lower supports 10 back to the side pieces 7, and from there to the South poles Z of the permanent magnets 9. From FIG. 2 it will be apparent that the lines of force 19 only affect the red electron beam 12′ and the green electron beam 13′. On the other hand, the field of the permanent magnets 9 follows another path from the North pole N and the protuberance 17 to the upper support 10, and back to the side pieces 7. FIG. 2 shows that this field 18 only affects the blue electron beam 11′. The permanent magnets 9 have the same strength and are magnetised in a direction at right angles to the longiutdinal axis of the suport 8. In the embodiment shown in FIG. 2, the direction of the lines of the various fields is indicated by the arrow heads. With these directions a lateral force is exerted on the three electron beams, indicated by the relevant arrows. By turning the rotatable support 8, the fields 18 and 19 may be reduced or increased in intensity so that the lateral displacement of the three eletcron beams may be increased or decreased at will. A 180° turn of the permanent magnets 9 reverses the positions of the North and South poles so that the direction of the fields 18 and 19 is reversed, and hence also the lateral displacement of the three electron beams. By means of the rotatable suport 8, static lateral convergence of the three electron beams 11′, 12′ and 13′ is achieved. It should be noted that it is not strictly necessary for the supports 10 to be made of permeable material. Even if the supports 10 are not made of permeable material, the fields 18 and 19 will practically follow the paths illustrated in FIG. 2. It will only be necessary to use stronger permanent magnets 9, and currents of a higher amplitude will have to flow through the coils 14 and 17.

With reference to FIGS. 4, 5 and 6, it will be explained more fully that not only a static but also a dynamic lateral convergence is required. For this purpose the coils 14 and 15, or the coil 16, may be employed. If an alternating current of the desired waveform passes through the coils 14 and 15, a current of negative polarity will reduce the intensity of the fields 18 and 19, so that the lateral departure of the electron beams 11′, 12′ and 13′ is reduced, whereas a positive-going current through these coils will increase the intensity of the fields 18 and 19 and hence also the lateral displacement. If the periods of these lateral-convergence currents are made equal to those of the deflection currents for the line deflection, the departures with respect to the vertical center line 20 (see FIGS. 4, 5 and 6) can be eliminated during each line scan by means of these convergence currents. If currents are passed through the coils 14 and 15, the three electron beams can be affected simultaneously, and the coil 16 may be dispensed with. However, only the coil 16 may be employed, through which a convergence current like that of the coils 14 and 15 is passed. In this case, only the intensity of the field 18 will be affected so that only the blue electron beam 11′ will be controlled. It will be explained with reference to FIG. 3 that this may be sufficient.

FIG. 3 illustrates the difference between radial convergence and lateral convergence. The radial convergence, obtained by known radial-convergence means 3, permits individual control of the three electron beams 11′, 12′ and 13′. The blue electron beam 11′ may be displaced by the means 3 along the line *a–b*, the red electron beam 12′ along the line *c–d* and the green electron beam 13′ along the line *e–f*. From FIG. 3 it will be apparent that, since the lines *a–b*, *c–d* and *e–f* do not intersect each other at one point, it is not possible to pass the three electron beams, by means of radial convergence alone, in common through one point at the area of the mask of the tube 1 (FIG. 3 is taken at the place of said mask). The means 3 are usually constructed so that the red beam 12′ and the green beam 13′ can be caused to coincide at one point *h*, but then separate steps have to be taken to displace the blue electron beam 11′ so that it goes through one common point coinciding with the beam 12′ and 13′. For this purpose the lateral-convergence means 2 are required.

As will be apparent from FIG. 2, these means may be constructed so that the blue electron beam 11′ can be displaced horizontally laterally in one direction, and the red beam 12′ and the green beam 13′ can be displaced in common in the opposite direction. The displacements may be continued until the line *a–b* goes through the point of intersection of the lines *c–d* and *e–f*.

As stated above, it is sufficient for display tubes having an angle of deflection of, for example, 70° to use only static lateral convergence. It suffices to pass the three electron beams by means of the permanent magnets through one common point for all points of the vertical center line 20 (which has to be considered as lying at the area of the shadow mask). Thus, during the deflection across the screen the lateral convergence did not need further consideration. However, it appears that with display tubes having angles of deflection of 90° and 110°, that at the edges of the screen the three electron beams do not pass through one common point, even when the radial convergence operates satisfactorily. With large angles of deflection it is therefore necessary to apply, in addition, dynamic lateral convergence.

A potential extent of departure is indicated in FIGS. 4, 5 and 6. The full lines of these figures represent the lines which would be written on the screen of the display tube if only the read beam 12′ and the green beam 13′ were operative and the radial convergence were adjusted correctly both in a static and a dynamic respect. The broken lines of these figures represent the lines which would be written for the blue electron beam 11′ if the radial convergence were operative correctly. The blue electron beam 11′ would then always be in the area of the mask at the same height as point *h*, but during the deflection it would depart therefrom laterally.

Three causes of departure may be indicated, that is to say physical varations in the tube 1, manufacturing tolerances in the deflection coils employed, and potential differences between the three electron guns. The first case is shown in FIG. 4*a*. It will be apparent from the Figure that lateral departures occur symmetrically on each side of the vertical central line 20. On the left-hand side of the vertical central line 20 the blue electron beam has to be displaced to the left and the red and green beams have to be displaced to the right. On the right-hand side of the line 20 the conditions are reversed. Therefore, the lateral-convergance current to be passed either through the coils 14 and 15 or through the coil 16 must have a waveform as is indicated by the curve 21 of FIG. 4*b*.

The second possibility is illustrated in FIG. 5A. A departure occurs only on the left-hand side of the line 20. This departure is usually greater than the symmetrical departures of FIG. 4A. This is clearly shown by the greater distances between the broken and the full lines of FIG. 5*a* than those of FIG. 4*a*. Therefore, the lateral convergence with a departure of FIG. 5*a* requires a current as represented by the curve 22.

FIG. 6*a* illustrates a departure only on the right hand side of the line 20. In this case a convergence current as represented by the curve 23 in FIG. 6*b* is required. All these currents can be produced by a circuit arrangement according to the invention, as shown in FIG. 7. This arrangement comprises a coil system 24 which is connected in series with an inductor 25 having a saturable core 26. In parallel with the coil system 24 there is connected a first adjustable inductor 27, and in series with the inductor 25 there is connected a second adjustable inductor 28.

In series with the said elements is connected a direct-voltage source 29, which is formed by a potentiometer 30 provided with a central tapping 31 and a variable tapping 32. The potentiometer 30 is connected to a direct-voltage source V supplying a direct voltage of a polarity indicated by the + and − signs on either side of the potentiometer 30. The two tappings 31 and 32 are interconnected by a capacitor 33 connected in series with the aforesaid elements. The capacitor 33 is a large capacitor so that the alternating current passes only through said capacitor.

The elements 24 to 33 are connected through the terminals 34 and 35 to a secondary winding 36 of a line output transformer 37. Only the secondary winding 36 and a primary winding 38 thereof are shown. The line output transformer 37 is of known type and it is connected so that the primary winding 38 is traversed by a substantially sawtooth current 39, as is illustrated in FIG. 4*b*. The coil system 24 may be formed by the coil 16 alone if only a lateral displacement of the blue electron beam 11' is desired, or it may be formed by the coils 14 and 15 if a lateral shift of the three electron beams is desired. In the latter case the coils 14 and 15 may be connected in series or in parallel.

The circuit arrangement shown in FIG. 7 operates as follows. The saturable core 26 is made of a material such that the inductance L of the coil 25, as a function of the passing current $I_1$, will have the waveform shown in FIG. 8. When the tapping 32 is exactly opposite the tapping 31, no direct voltage will be operative across the capacitor 33, so that the current passing through the circuit connected to the secondary winding 36 will oscillate around the zero line, as indiacted by the curve 40 of FIG. 8. With low currents the inductance of the inductor 25 is therefore very high, that is to say of the order of 12 to 13 mh. As a result, the current induced in the winding 36 is, practically speaking, not capable of passing a current through the coil system 24. With higher values of the current 40, however, the inductance L decreases strongly, so that a very high current can flow through the coil system 24. In this case the coil system 24 is traversed by a current illustrated by the curve 21 in FIG. 4*b*.

If the tapping 32 is shifted towards the negative terminal of the voltage source V, a negative-going direct current passes through the circuit connected to the secondary winding 36. If the tapping 32 is in its extreme position, a preadjustment is obtained as is indicated by the broken line 41 in FIG. 8. The alternating current then passing through said circuit will oscillate around the line 41, as is indicated by the curve 42 in FIG. 8. Therefore, during the negative half period of the current 42 a very small inductance will be operative, so that a very high current passes through the coil system 24. With the positive value of the current 42, however, the inductance of the inductor 25 will increase strongly, so that substantially for the whole positive period the current passing through the coil system will be zero. By this mode of adjustment a current is obtained that is illustrated by the curve 22 in FIG. 5*b*.

Figure 8:
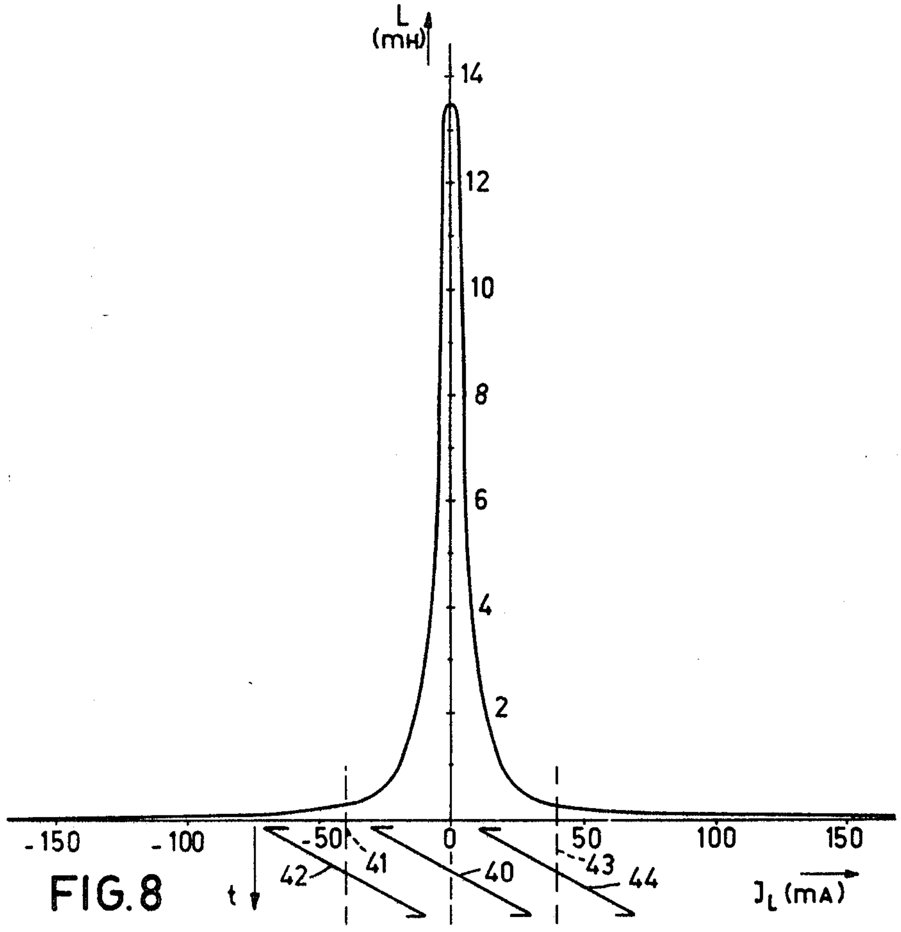

If the tapping 32 is shifted towards the positive terminal of the source V, a pre-adjustment as indicated by the broken line 43 in FIG. 8 is obtained. A current 44 will oscillate around said line 43. As is described for the current 42, it can be proven that by this pre-adjustment the coil system 24 will be traversed by a current indicated by th ecurve 23 in FIG. 6*b*. It will be obvious that by displacing the tapping 32 between the extreme positions indicated by the lines 41 and 43, any curve lying between the curves 21 and 22 and between the curves 21 and 23 can be obtained in the intermediate positions.

Apart from the waveform, also the amplitude of the currents 21, 22 and 23 must be adjustable. This has to be carried out so that the amplitude of the current passing through the coil system 24 varies, yet the current passing through the inductor 25 does not vary, since otherwise the inductance L of the coil 25 would be varied and hence also the waveform of the currents. The latter is undesirable. According to a further feature of the invention, an amplitude adjustment is obtained which is independent of the current waveform. For this purpose the inductors 27 and 28 are provided. The latter two inductors can be adjusted by means of displaceable cores so that, when the inductance of the coil 27 increases, that of the coil 28 decreases, and conversely. If the overall impedance of the parallel-connected coils 27 and 24 decreases or increases, that of the inductor 28 increases or decreases, respectively, so that the overall impedance across the secondary winding 36 remains constant under all conditions. It will be obvious that with a constant current through the coil 25, the current passing through the coil system 24 can nevertheless be varied by varying the coil 27. Thus the amplitude control of the lateral-convergence currents through the coil system 24 is obtained independently of the current waveform.

Although it is supposed in the foregoing that the departures occur as is illustrated in FIGS. 4*a*, 5*a* and 6*a*, they also may be in the reverse sense. In that case, the currents of 4*b*, 5*b*, 6*b* have to be reversed in phase 180. This can be achieved by interchanging the connecting terminals 34 and 35 so that they are connected to the secondary winding 36 along the broken lines 45 and 46, instead of along the full lines. This may be carried out by constructing the terminals 34 and 35 in the form of plug sockets so that the plugs can be interchanged at will. As an alternative, this may be achieved by means of a bipolar switch which can be commutated for the interchange.

In one embodiment comprising a 25" 90° color television display tube 1, the inductance of the coil system 24 was 1 mh. and the coil 25 was wound on an annular core of the type Philips 2P65331, having a thickness of 3 mms., an inner diameter of 6 mms. and an outer diameter of 9 mms. This ferroxcube core was provided with 100 turns of copper wire of a thickness of 0.18 mm. A core thus wound has a curve as illustrated in FIG. 8. The number of turns of the secondary winding 36 was chosen so that fly-back pulses of an amplitude of 130 v. were obtained. The maximum peak-to-peak value of the attainable correction currents was 300 ma. The applied direct voltage V was 4 v. and the potentiometer 30 had a value of 25 ohms.

Although in the foregoing the lateral-convergence means described with reference to FIG. 2 are used, the principle of the invention may, of course, be realised also with the aid of other lateral-convergence means. It is, for example, possible to construct a yoke producing only a field like the field 18 of FIG. 2, which acts only on the blue electron beam 11'. Such an arrangement has the disadvantage, however, that a comparatively large shift of the blue electron beam in the lateral direction is required. It is therefore preferred to displace the electron beam 11' in one direction and the electron beam 12' and 13' in the opposite direction so that the two shifts each cover only half the distance. Irrespective of the lateral-convergence means used, the circuit arrangement shown in FIG. 7 remains unchanged.

What is claimed is:

1. In a color television system having a color cathode ray tube including means for producing three electron beams, a circuit for dynamic lateral convergence of at least one of said three electron beams comprising, a line output transformer in which the line deflection current flows, deflection means for the common deflection of the electron beams coupled to said output transformer, at least one lateral convergence coil mounted adjacent said tube so that a current flowing therein produces a magnetic field in the tube that exerts a lateral force in the line direction on at least one of the three electron beams, a saturable reactor comprising an inductor wound on a saturable core, and means connecting said covergence coil in series with said inductor to a winding of the line output transformer.

2. A circuit as claimed in claim 1 further comprising an adjustable source of direct voltage connected in series with said series combination of the convergence coil and the inductor and arranged to supply no direct-voltage, a positive-going direct voltage or a negative-going direct voltage, and a capacitor connected in shunt with said source of direct voltage.

3. A circuit as claimed in claim 1 further comprising a first adjustable inductor connected in parallel with the convergence coil, a second adjustable inductor connected in series with this parallel combinatioin and the inductor with the saturable core, the adjusting means of the two adjustable inductors being mechanically coupled with each other so that during adjustment the inductance of one inductor increases and that of the other decreases in a manner such that the amplitude of the current passing passing through the convergence coil is varied while the current passing through the inductor with the saturable core is not varied.

4. In a color television system having a cathode ray tube with means for producing three electron beams and means for deflecting the beams in a raster, the improvement comprising, a convergence coil mounted adjacent said tube for producing a magnetic field therein that exerts a lateral force on at least one of said electron beams, a saturable reactor comprising an inductor wound on a saturable core, means connecting said convergence coil in series circuit with said inductor, and means for applying a sawtooth current of line deflection frequency to said series circuit of a magnitude to periodically saturate said core and produce a non-linear current flow in said convergence coil.

5. A system of the type claimed in claim 4 further comprising means for passing a DC current through said convergence coil that is adjustable in magnitude to prebias the saturable core at a given level that is determined by the divergence of the electron beams.

6. A system of the type claimed in claim 5 further comprising first and second adjustable inductors, means connetcing said first adjustable inductor in parallel with the convergence coil, means connecting said second adjustable inductor in series with the saturable inductor and said parallel combination, and means for simultaneoulsy adjusting said first and second adjustable inductors so that the inductances thereof vary in opposite directions.

7. A system of the type claimed in claim 4 wherein said sawtooth current applying means comprises the line deflection output transformer of the television system, and means connecting said convergence coil in series with said inductor across a winding of said output transformer.

8. A system of the type claimed in claim 7 further comprising an adjustable source of direct voltage connected in series with said convergence coil and said inductor across said transformer winding, the magnitude and polarity of said direct voltage being adjustable to pre-bias the saturable core at different levels.

9. A system of the type claimed in claim 8 further comprising a capacitor connected in parallel with said source of direct voltage to provide a low impedance path for currents at the deflection frequency.

10. A system of the type claimed in claim 4 further comprising a second convergence coil mounted adjacent said tube for producing a magnetic field therein that exerts a lateral force on at least one of said electron beams, said first and second convergence coils being arranged to produce magnetic fields in the tube that simultaneosuly deflect two of said electron beams in one lateral direction and the third electron beam in the opposite lateral direction.

11. A system of the type claimed in claim 10 further comprising a yoke composed of permeable material mounted about said tube so as to direct the magnetic fields produced by said first and second coils in the manner defined, and at least one adjustable permanent magnet mounted on said yoke to produce a static lateral convergence field in said tube.

12. A television system comprising, a cathode ray tube with means for producing three electron beams and means for deflecting the beams in a raster, at least one convergence coil mounted adjacent said tube for producing a magnetic field therein that exerts a lateral force on at least one of said electron beams, a line deflection transformer having a winding in which a sawtooth current of line deflection frequency flows, a saturable reactor, means connecting said saturable reactor in series with said convergence coil across said transformer winding, and means for adjusting the amplitude of the current flow in said series circuit so that the core of said saturable reactor saturates during a portion of the forward scan of the sawtooth current to cause the current flowing in said convergence coil to vary in a nonlinear manner during said forward scan.

13. A system as claimed in claim 12 further comprising means for pre-biasing the core of said saturable reactor at a given level so as to alter the current waveform in said convergence coil in accordance with the degree of divergence of said electron beams.

References Cited

UNITED STATES PATENTS 3,307,067 2/1967 Jachim et al. -------- 315—13

RODNEY D. BENNETT, Jr., *Primary Examiner.*

MALCOLM. F. HUBLER, *Assistant Examiner.*